United States Patent
Dorner et al.

(10) Patent No.: US 9,920,929 B2
(45) Date of Patent: Mar. 20, 2018

(54) METHOD FOR REDUCING SLAG IN BIOMASS COMBUSTION

(75) Inventors: Robert W. Dorner, Naperville, IL (US); Nandakumar Srinivasan, Naperville, IL (US); Jitendra Shah, Naperville, IL (US); Hung-Ting Chen, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 647 days.

(21) Appl. No.: 13/159,013

(22) Filed: Jun. 13, 2011

(65) Prior Publication Data

US 2012/0312206 A1  Dec. 13, 2012

(51) Int. Cl.
| | |
|---|---|
| F23B 90/00 | (2011.01) |
| F23K 1/00 | (2006.01) |
| F23J 9/00 | (2006.01) |
| C10L 10/04 | (2006.01) |
| C10L 5/44 | (2006.01) |

(52) U.S. Cl.
CPC .............. *F23K 1/00* (2013.01); *C10L 10/04* (2013.01); *F23J 9/00* (2013.01); *C10L 5/44* (2013.01); *C10L 2200/025* (2013.01); *C10L 2200/0209* (2013.01); *C10L 2200/0213* (2013.01); *C10L 2200/0218* (2013.01); *F23K 2201/505* (2013.01); *Y02E 50/30* (2013.01)

(58) Field of Classification Search
USPC ........................................................ 110/342
See application file for complete search history.

(56) References Cited

U.S. PATENT DOCUMENTS

| | | | | |
|---|---|---|---|---|
| 3,002,826 | A * | 10/1961 | Norris .............................. | 44/301 |
| 4,953,481 | A * | 9/1990 | Clayton ......................... | 110/342 |
| 7,845,292 | B2 | 12/2010 | Martin et al. | |
| 2006/0121398 | A1* | 6/2006 | Meffert et al. .................... | 431/4 |
| 2006/0265954 | A1* | 11/2006 | Dogru et al. ............... | 48/197 R |
| 2007/0044693 | A1* | 3/2007 | Smyrniotis et al. .......... | 110/342 |
| 2008/0005958 | A1 | 1/2008 | Factor et al. | |
| 2009/0071067 | A1 | 3/2009 | Macpherson et al. | |
| 2009/0163647 | A1* | 6/2009 | DeLuca et al. ............... | 524/588 |
| 2009/0194262 | A1* | 8/2009 | Roppo et al. .............. | 165/134.1 |
| 2009/0205546 | A1* | 8/2009 | Kluko ........................... | 110/261 |
| 2009/0324478 | A1* | 12/2009 | Hinman et al. ............... | 423/345 |
| 2010/0006014 | A1* | 1/2010 | Smyrniotis et al. .......... | 110/343 |
| 2010/0024397 | A1* | 2/2010 | Chi et al. ......................... | 60/285 |
| 2010/0077653 | A1* | 4/2010 | Hughes et al. ................. | 44/354 |

FOREIGN PATENT DOCUMENTS

| | | |
|---|---|---|
| KR | 20100111568 | 10/2010 |
| WO | 2006031011 A1 | 3/2006 |

OTHER PUBLICATIONS

Boström et al., "Ash Transformation Chemistry During Energy Conversion of Biomass," Conference on Impacts of Fuel Quality on Power Production & Environment, Finland, 2010.
Zheng et al., "Deactivation of V2O5-WO3-TiO2 SCR catalyst at a biomass-fired combined heat and power plant," Applied Catalysis B: Environmental, vol. 60, 2005, pp. 253-264.
Dunnu et al., "Ash Fusability and Compositional Data of Solid Recovered Fuels," Fuel, vol. 89, pp. 1534-1540, 2010.
Davidsson et al., "Kaolin Addition During Biomass Combustion in a 35 MW Circulating Fluidized-Bed Reactor," Energy & Fuels, vol. 21, pp. 1959-1966, 2007.
Lindberg et al., "Towards a Comprehensive Thermodynamic Database for Ash-Forming Elements in Biomass and Waste Combustion—Current Situation and Future Developments," Power Production & Environment, 2010.
Lindstrom et al., "Slagging Characteristics During Combustion of Woody Biomass Pellets made from a Range of Different Forestry Assortments," Energy Fuels, vol. 24, pp. 3456-3461, 2010.
Lindstrom et al., "Slagging Characteristics During Combustion of Cereal Grains Rich in Phosphorous," Energy & Fuels, vol. 21, pp. 710-717, 2007.
Spiro et al., "Deposit Remediation in Coal-Fired Gas Turbines through the use of Additives," Prog. Energy Combust. Sci., vol. 16, pp. 213-220, 1990.
Uberoi et al., "The Kinetics and Mechanism of Alkali Removal from Flue Gases by Solid Sorbents," Prog. Energy Combust. Sci., vol. 16, pp. 205-211, 1990.

* cited by examiner

*Primary Examiner* — Jason Lau
(74) *Attorney, Agent, or Firm* — Leydig, Voit & Mayer, Ltd.

(57) ABSTRACT

Biomass is quickly becoming an important feedstock for energy generation in power plants. Due to their composition and nature, certain biomass fuels contribute to slagging, fouling, and corrosion. This invention provides a novel method of reducing or suppressing slag deposition and/or cleaning deposited slag in energy production processes in which potassium-containing solid fuels are combusted. Besides acting as a slag suppressant, further advantages of this invention are that the additive has no detrimental side-effects on capital equipment, increases slag friability, decreases slag fouling rate, reduces heat transfer corrosion as well as increasing the lifetime of the selective catalytic reduction catalyst.

5 Claims, No Drawings

METHOD FOR REDUCING SLAG IN BIOMASS COMBUSTION

TECHNICAL FIELD

This invention relates generally to an additive for reducing slag formation and deposition in energy production processes. More specifically, the invention relates to a combination of aluminum and magnesium compounds used in the potassium-containing solid fuel combustion processes. The invention has particular relevance to biomass combustion.

BACKGROUND OF THE INVENTION

Biomass is quickly becoming an important feedstock for energy generation in power plants. Slagging and fouling are the two main issues with certain biomass fuels due to their composition and nature. From a chemical point of view, most ashes from biomass could be characterized as silicate dominated systems with varying content of basic oxides and a relatively high degree of volatilization of alkali sulfates and chlorides (See D. Boström et al., *Conference on Impacts of Fuel Quality on Power Production & Environment*, Finland, 2010). Due to the significantly different chemical make-up of biomass fuels (high $K_2O$, high $SiO_2$, and low $Al_2O_3$) in comparison to coal, biomass ash typically has a very low melting behavior compared to coal ash (high $SiO_2$, high $Al_2O_3$, low $K_2O$) which leads to higher slagging potential. At a high silica and low alumina concentration, it is known in the art that the ash will predominantly form low temperature eutectics where potassium will act as a further fluxing agent (G. Dunnu, J. Maier, G. Scheffknecht, *Fuel*, 89, 2010, 1534-1540).

The use of additives for the purpose of gaining performance advantages in fuel combustion has been given much attention in the art. Such additives may generally be classified as (1) preflame additives (for improved storage and handling of fuel), (2) combustion additives (for improved combustion efficiency and reduction of pollutants and particulates), and (3) post-flame functioning additives (for particulate collection, fireside deposit control, and cold side corrosion reduction). In the present invention, the emphasis is on class (3) fuel additives, especially those which control the deposits of slag including in commercial-sized furnaces using coal and other solid fuels.

Among known class (3) additives are magnesium-based additives, such as magnesium oxide and metallic magnesium particles, which can be added to slag and slag precursors by spraying or injecting into a combustion chamber. Reduction in deposits in both oil and coal fired boilers has been reported (See U.S. Pat. No. 7,845,292, "Process for Slag and Corrosion Control in Boilers." Kaolin is another known additive to coal as well as biomass fuels, acting as a slag suppressant. The presence of silica in Kaolin's structure, however, will encourage the formation of potassium silicates which are known to promote slagging (See E. Lindstroem et al., *Energy & Fuels* 24, 2010, 3456-3461). Gibbsite has also been used as an additive for coal to reduce slagging. Its application is specified for coal rich in calcium and iron, creating calcium-silica-alumina compounds (See Smyrniotis, C. R. et al., "Targeted reagent injection for slag control from combustion of coals high in iron and/or calcium," PCT Publication Number: WO2010006325).

During combustion in a boiler furnace, reactions involving fuel impurities lead to deposit formation which adheres to boiler surfaces. Such deposits upset the normal operating conditions and produce problems by causing: (a) obstruction to gas flow; (b) interference with heat transfer resulting from the insulative nature of such deposit; (c) damage to water tubes on the ash slopes particularly with bulky deposits; (d) corrosive conditions producing substantial loss of metal tubes. These deposits and associated corrosion force costly nonscheduled outages for cleaning (e.g., deslagging) and/or for replacing the failed tubes.

There thus exists an ongoing industrial need for new and improved class (3) fuel and slag treatment additives to minimize the slagging and deposit producing (i.e., fouling) potentials of biomass and other combustible organic solid fuel combustion products.

SUMMARY OF THE INVENTION

This invention accordingly provides a novel method of reducing or suppressing slag deposition and/or cleaning deposited slag in an energy production process. In an aspect, the method includes adding a slag-reducing composition to the energy production process having a potassium-containing solid fuel combustion process. The slag-reducing composition comprises (i) an aluminum-containing compound and (ii) a magnesium-containing compound. The aluminum-containing compound and the magnesium-containing compound may be added separately or simultaneously to the energy production process.

It is an advantage of the invention to provide a slag reducing composition where the different constituents of the composition will not have any detrimental side effects to the capital equipment, such as the combustor or boiler unit.

It is another advantage of the invention to provide a slag-reducing composition with benefits of increasing a slag friability, decreasing a slag fouling rate, decreasing corrosion, reducing heat transfer corrosion, and combinations thereof.

An additional advantage of the invention is to provide a slag-reducing composition with benefits of reducing heat transfer corrosion for solid fuels that include chloride.

It is a further advantage of the invention to increase a practical use lifetime of a selective catalytic reduction catalyst in the energy production process by reducing catalyst deactivation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

The disclosed invention is intended for use in any combustion system using a biomass or biomass-derived solid fuel source. As used herein, the term "biomass" is meant to encompass any solid fuel prepared from biological sources (e.g., wood, straw, wheat, the like, and combinations thereof) and any solid fuel that at least partially comprises such including combinations with coal. Biomass is typically prepared from non-hazardous waste sources (and is also sometimes combined with coal prior to or during combustion) to be used for energy recovery in incineration and co-incineration plants. Preparation commonly involves processing, homogenizing, pelletizing, and other quality controlling methods to upgrade it to a quality that is fungible and commoditized. This invention provides an effective novel method of reducing slagging produced from biomass combustion.

Tables 1a and 1b below illustrate the differences between coal and biomass in the amount of fixed carbon, volatile matter, and ash composition. It can be seen that ash content is dependent upon biomass type. Interestingly, the same biomass fuel (e.g. Poplar or Corn Stover) can have significantly different amounts of ash if harvested in different seasons or regions. The amount of ash is influenced by plant type, plant fraction, growing conditions, fertilization, choice of harvest date, harvest techniques, etc.

TABLE 1a

| | Proximate [wt % AR] | | | | |
|---|---|---|---|---|---|
| Description | Moisture | Ash | Volatile Matter | Fixed Carbon | HHV, Btu/lb |
| Wood pellet | 4.62% | 0.52% | 73.03% | 21.83% | 8,377 |
| Coal | 3.00% | 12.00% | 34.10% | 50.80% | 11,666 |

TABLE 1b

| Fuel | % Ash |
|---|---|
| Coal | 5 to 15 |
| Wood | 0.5 to 4 |
| Straw | 2 to 10 |
| Sunflower | 1 to 5 |
| Wheat | 4 to 13 |

Table 2 below illustrates the composition of a representative sampling of biomass and coal ash (from XRF analysis). Among other differences in ash components shown below, potassium oxide content is significantly higher in biomass compared to coal. Not intending to be theory bound, the mechanism of this invention exploits the potassium content to reduce slagging.

TABLE 2

| Wt % | Coal | Wood | Straw | Wheat |
|---|---|---|---|---|
| Ash | 16 | 2 | 5 | 5 |
| $Al_2O_3$ | 26 | 7 | 1 | 1 |
| CaO | 6 | 37 | 7 | 2 |
| $Fe_2O_3$ | 6 | 3 | 1 | 0 |
| MgO | 3 | 9 | 5 | 11 |
| $P_2O_5$ | 1 | 3 | 20 | 54 |
| $K_2O$ | 3 | 17 | 23 | 24 |
| $SiO_2$ | 47 | 18 | 39 | 7 |
| $Na_2O$ | 1 | 1 | 0 | 0 |
| $SO_3$ | 5 | 2 | 3 | 0 |
| $TiO_2$ | 1 | 0 | 0 | 0 |
| $MnO_2$ | 0 | 3 | 0 | 0 |
| Cl | 0 | 0 | 2 | 0 |

In a preferred embodiment, this invention comprises a method of reducing or suppressing slag deposition and/or cleaning deposited slag in an energy production process. Such slag reduction is accomplished via adding a slag-reducing composition to a potassium-containing solid fuel combustion process in the energy production process. The slag-reducing composition of the invention comprises (i) an aluminum-containing compound and (ii) a magnesium-containing compound.

Introduction of the slag-reducing composition to the combustion process may occur at any point of the biomass feeding system. The biomass feeding system is usually comprised of six main components: (1) biomass conveyance line from the fuel yard, (2) a pellet storage silo, (3) hammer mills, (4) dust separation cyclone filters, (5) powder silo, and (6) a biomass injection system. The method of this invention may be implemented at any one or more of these or other suitable locations in the energy production process. A preferred location of addition for the slag-reducing composition is biomass conveyance line from the fuel yard.

In an embodiment, the method of the invention includes adding the disclosed slag-reducing composition into a combustor in the potassium-containing solid fuel combustion process.

In an embodiment, the method of the invention includes injecting the disclosed slag-reducing composition into a combustor in the potassium-containing solid fuel combustion process.

In an embodiment, the method of the invention includes adding the disclosed slag-reducing composition into a solid fuel prior to form a treated solid fuel and introducing the treated solid fuel into the potassium-containing solid fuel combustion process.

In embodiments, the method of the invention includes adding the slag-reducing composition during processing, homogenizing, pelletizing, etc. of biomass.

In an embodiment, the method of the invention includes a solid fuel for the potassium-containing solid fuel combustion process comprising biomass. In embodiments, the solid fuel includes a combination of biomass and coal.

In alternative embodiments, the method of the invention includes adding the aluminum-containing compound and the magnesium-containing compound to the energy production process separately or simultaneously.

In embodiments, the method of the invention includes a plurality of different aluminum-containing compounds and/or a plurality of different magnesium-containing compounds.

In an embodiment, the aluminum-containing compound comprises an aluminum salt. A benefit of using salts is that means all or nearly all aluminum ions are available and active for reaction Representative salts include, for example, $Al_2(SO_4)_3$ and AlX where X is a halide.

In an embodiment, the aluminum-containing compound comprises $Al_2O_3$ or at least one chemical compound that forms $Al_2O_3$ upon combustion in the potassium-containing solid fuel combustion process. In a preferred embodiment, the aluminum-containing compound comprises a component selected from at least one of the following: $Al(OH)_3$; AlO(OH); $Al_2(SO_4)_3$; $Al_2O_3$; $Al(OOCR)_3$, wherein R is an alkyl; AlX, wherein X is selected from bromide, chloride, fluoride, iodide, and combinations thereof; and combinations of the foregoing. Preferred aluminum-containing compounds include $Al(OH)_3$ and $Al_2(SO_4)_3$. As used herein, "alkyl" refers to a monovalent group derived from a straight or branched chain saturated hydrocarbon by the removal of a single hydrogen atom. Representative alkyl groups include methyl; ethyl; n- and iso-propyl; n-, sec-, iso-, and tert-butyl; $C_5$ to $C_{12}$ groups; eicosanyl ($C_{20}$); heneicosanyl ($C_{21}$); docosyl (behenyl, $C_{22}$); tricosanyl ($C_{23}$); tetracosanyl ($C_{24}$); pentacosyl ($C_{25}$), 3-, 7-, and 13-methylhexadecanyl; and the like. Preferred alkyls include methyl, ethyl, propyl, isopropyl, butyl, and isobutyl.

In embodiments, the aluminum-containing compound comprises a component selected from at least one of the following: Gibbsite, at least one polymorph thereof, and/or at least one polytype thereof; Boehmite, at least one polymorph thereof, and/or at least one polytype thereof; and combinations thereof. It should be noted that the raw material bauxite from which both Al(OH)$_3$ and AlO(OH) are extracted is, however, not a suitable alternative as it is too high in impurities, such as iron, which will have a detrimental effect on slag formation.

Not intending to be theory bound, it is believed that the aluminum-containing compound of the invention generally acts as a binder for silicates and potassium contained in biomass ash resulting in the formation of high temperature melting eutectics. Other constituents in the ash may also be involved. It is known in the art that biomass fuels are rich in potassium and silicon, which are known to combine to form glassy deposits upon combustion generally as species such as K$_2$Si$_2$O$_5$. These glassy slag deposits are highly undesirable as they are very hard to remove. Potassium silicates have low melting points, with several compounds melting temperatures being lower than 700° C. (Baxter et al. *Fuel Processing Technology* (1998) 47-78)). The addition of, for example, Al(OH)$_3$ or Al$_2$(SO$_4$)$_3$ to the biomass fuel results in the formation of species such as KAlSiO$_4$ (Kaliophilite—melting point of 1750° C.) (C. Klein and C. S. Hurlbut, Jr., Manual of Mineralogy, 1985 John Wiley and Sons, Inc.). Such compounds not only have high melting points, but are also less glassy in nature and thus more friable.

In the absence of aluminum addition to the biomass combustion process, the following reaction generally takes place (potassium silicate formation):

$$2KCl + 2SiO_2 + H_2O \rightarrow K_2Si_2O_5 + 2HCl$$

Upon addition of Al$_2$(SO$_4$)$_3$ to the biomass combustion process, the following reactions generally takes place (potassium aluminosilicate formation):

$$Al_2(SO_4)_3 + 2SiO_2 + 2KCl \rightarrow 2KAlSiO_4 + 2HCl + 3SO_3^{2-}$$

Addition of Al(OH)$_3$ to the biomass combustion process generally results in the following reaction (potassium aluminosilicate formation):

$$Al(OH)_3 + SiO_2 + KCl \rightarrow KAlSiO_4 + HCl + H_2O$$

The slag-reducing composition of the invention functions partially through these reaction processes to combine with silicates and/or potassium (or any other fuel constituent) present in biomass to form high melting temperature eutectics, leading to a reduction in slag formation.

In an embodiment, the slag-reducing composition further comprises a magnesium-containing compound. It is though that that addition of this compound enhances binding of inorganic species present in the biomass fuels resulting in high temperature melting eutectics. Moreover, addition of magnesium-containing compounds results in unexpected synergism, as shown in example 1 below.

In embodiments, the magnesium-containing compound comprises a magnesium salt. A benefit of using salts is that means all or nearly all magnesium ions are available and active for reaction. Representative salts include, for example, MgSO$_4$, Mg(NO$_3$)$_2$, MgCO$_3$, and Mg(HCO$_3$)$_2$.

In an embodiment, the magnesium-containing compound comprises MgO or at least one chemical compound that forms MgO upon combustion in the potassium-containing solid fuel combustion process. In a preferred embodiment, the magnesium-containing compound comprises a component selected from at least one of the following: Mg(OH)$_2$; MgSO$_4$; Mg(NO$_3$)$_2$; MgCO$_3$; Mg(HCO$_3$)$_2$; and combinations thereof. The preferred magnesium-containing compound is Mg(OH)$_2$.

In embodiments, the method of the invention comprises the use of a plurality of different aluminum-containing compounds and/or a plurality of different magnesium-containing compounds.

In alternative embodiments, the slag-reducing composition further comprises: a wet slurry; a dry powder; a solution; and combinations thereof.

In embodiments, the slag-reducing composition of the invention comprises a weight ratio of the aluminum-containing compound and the magnesium-containing compound of about 0.1:1 and 10:1 within the slag-reducing composition.

In embodiments, the slag-reducing composition of the invention may be used in conjunction with at least one other organic or inorganic component selected from: slag reducer or suppressor, corrosion inhibitor, fouling inhibitor, and combinations thereof.

In various embodiments, the dosage of the slag-reducing composition of the invention may vary within broad ranges. Typically, a suitable range is from about 1 to about 100 mass percent active, more preferably from about 2 to about 50 mass percent active, and most preferably from about 5 to about 35 mass percent active in relation to the total biomass ash content.

The amount of aluminum-containing compound and magnesium-containing compound and their respective ratios applied to the system may vary depending on the particular application. The particular amount or ratio that will be most effective or efficient in a certain application would be discernable by an ordinarily skilled artisan. The term "total additive" refers only to the aluminum-containing compound(s) and magnesium-containing compound(s) (specifically to the aluminum and magnesium present in those compounds according to a preferred embodiment) present in the total amount of additive added to the process exclusive of other components that may be present in the additive or added to the process.

For solid fuels derived from an agricultural source (i.e., agro-fuels or biomass) that are rich in silica, the amount of aluminum-containing compound used in the process according to the present invention may vary within broad ranges. A suitable range is generally from about 1 to about 100 mass percent (based on total mass of additive), more preferably from about 25 to about 99 mass percent of total additive, and most preferably from about 50 to about 95 mass percent of total additive.

For agro-fuels rich in silica, the amount of magnesium-containing compound used in the process according to the present invention may also vary within broad ranges. A suitable range is generally from about 1 to about 99 mass percent (based on total mass of additive), more preferably from about 5 to about 75 mass percent of total additive, and most preferably from about 10 to about 50 mass percent of total additive.

For agro-fuels, rich in phosphorus, the amount of aluminum-containing compound used in the process according to the present invention may also vary within broad ranges. A suitable range is generally from about 1 to about 99 mass percent (based on total mass of additive), more preferably from about 1 to about 50 mass percent of total additive, and most preferably from about 5 to about 30 mass percent of total additive.

For agro-fuels, rich in phosphorus, the amount of magnesium-containing compound used in the process according to the present invention may also vary within broad ranges. A suitable range is general from about 20 to about 100 mass percent (based on total mass of additive), more preferably from about 50 to about 99 mass percent of total additive, and most preferably from about 70 to about 95 mass percent of total additive.

For wood fuels in particular, the amount of aluminum-containing compound used in the process according to the present invention also varies within broad ranges. A suitable range is generally from about 10 to about 90 mass percent (based on total mass of additive), more preferably from about 15 to about 75 mass percent of total additive, and most preferably from about 25 to about 60 mass percent of total additive. The range of magnesium-containing compound likewise varies within broad ranges for wood fuels. A suitable range is generally from about 20 to about 95 mass percent (based on total mass of additive), more preferably from about 30 to about 80 mass percent of total additive, and most preferably from about 40 to about 75 mass percent of total additive.

The foregoing may be better understood by reference to the following examples, which are intended for illustrative purposes and are not intended to limit the scope of the invention or its application in any way.

Example 1

This example illustrates synergism between the combination of the aluminum-containing compound and the magnesium-containing compound to reduce slag buildup in the energy production process. Compression test results performed on biomass ash pellets containing different additives as well as pure fuel (straw in this example). $Al(OH)_3$ had little impact by itself on the friability of the straw fuel and was comparable to the pure fuel. It can be seen in Table 3 that $Mg(OH)_2$, on the other hand, reduced the pellets tensile strength leading to it breaking easier than the pure fuel. Unexpectedly, a 50/50 mixture of $Mg(OH)_2$ and $Al(OH)_3$ led to an even lower compression strength needed to break the pellet. The combination showed a clear synergistic effect in reducing the tensile strength of the biomass ash.

TABLE 3

| Ashes | Compression strength (psi) | Standard deviation |
|---|---|---|
| Straw | 440.85 | 86.2 |
| Straw + $Mg(OH)_2$ (50%) and $Al(OH)_3$ (50%) | 194.02 | 28.8 |
| Straw + $Mg(OH)_2$ | 317.9 | 21.3 |
| Straw + $Al(OH)_3$ | 700 | 25 |

Example 2

Ash fusion tests (AFT) carried out in the laboratory with a set of different biomasses (straw, wheat, and wood in this example) with and without the slag-reducing composition (i.e., additive) of the invention showed significant differences. Ash obtained from the different biomasses were pressed into cones and AFT tests performed. Furthermore, additives were mixed with the different fuels prior to ashing, with the remainder of the testing being identical. Fluid temperatures (FT) (all temperatures are in ° C.) were used this study to compare the performance of the biomass and biomass-additive combinations. FT is the temperature at which the ash is completely fused into a viscous mass.

Table 4 shows performance of an $Mg(OH)_2/Al(OH)_3$ (ratio as indicated) in increasing the fluid temperature of a wood biomass fuel. For a specific pure wood sample, a melting temperature (FT) of 1285° C. was observed. If a 30/70 $Al(OH)_3/Mg(OH)_2$ was added, FT was increased to 1390° C. This ratio of $Al(OH)_3/Mg(OH)_2$ was shown to have improved performance for several wood samples tested.

TABLE 4

| Biomass | Fluid Temp |
|---|---|
| Wood | 1286 |
| Wood + $Mg(OH)_2$ (50%) and $Al(OH)_3$ (50%) | 1369 |
| Wood + $Mg(OH)_2$ (30%) and $Al(OH)_3$ (70%) | 1397 |
| Wood + $Al(OH)_3$ | 1302 |

Table 5 shows performance of an $Al(OH)3$ additive, an $Al(OH)_3/Mg(OH)_2$ (ratio 50/50) additive, and $Al_2(SO_4)_3$ additive in increasing the fluid temperature of a straw biomass fuel.

TABLE 5

| Biomass | Fluid Temp |
|---|---|
| Straw | 1235 |
| Straw + $Al(OH)_3$ | 1431+ |
| Straw + $Mg(OH)_2$ (50%) and $Al(OH)_3$ (50%) | 1425 |
| Straw + $Al_2(SO_4)_3$ | 1347 |

For straw, a melting temperature of 1450° C. was observed when using an Al-rich additive. The addition of both Gibbsite and Boehmite resulted in cones that had a melting temperature of 1450° C., the AFT equipment's upper measurement limit. It was an unexpected observation that the straw cone did not melt and remained solid and unaltered even when the furnace reached a temperature of 1450° C. with the addition of Boehmite. When a 50/50 $Al(OH)_3/Mg(OH)_2$ additive was used instead of the pure fuel, a significant increase in FT was still observed (from 1235° C. to 1428° C.) but melting of the cone did occur within the furnace operating condition range.

Table 6 shows performance of a Mg-rich additive in increasing the fluid temperature of a wheat biomass fuel.

TABLE 6

| Biomass | Fluid Temp |
|---|---|
| Wheat | 1149 |
| Wheat + $Mg(OH)_2$ | 1345 |
| Wheat + $CaCO_3$ | 1271 |

Example 3

This example illustrates in Table 7 various compositions for the slag-reducing composition or additive of the invention.

TABLE 7

| Component | Chemical Formula | % Range |
|---|---|---|
| Gibbsite | $Al(OH)_3$ | 0 to 100 |
| Boehmite/Diaspore | $AlO(OH)$ | 0 to 100 |
| Aluminum Sulfate | $Al_2(SO_4)_3$ | 0 to 100 |
| Alumina | $Al_2O_3$ | 0 to 100 |
| Magnesium Hydroxide | $Mg(OH)_2$ | 0 to 100 |

TABLE 7-continued

| Component | Chemical Formula | % Range |
|---|---|---|
| Magnesium Sulfate | $MgSO_4$ | 0 to 100 |
| Magnesium Nitrate | $Mg(NO_3)_2$ | 0 to 100 |
| Magnesia | MgO | 0 to 100 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of reducing or suppressing slag deposition and/or cleaning deposited slag from combustion of a solid fuel in an energy production process, wherein the solid fuel is a potassium-containing biomass feedstock consisting of at least one biological plant, the method comprising: adding to the combustion an aluminum-containing compound and a magnesium-containing compound.

2. The method of claim 1, wherein the plant is selected from the group consisting of wood, straw, wheat, and combinations thereof.

3. The method of claim 1, wherein the aluminum-containing compound is selected from the group consisting of $Al(OH)_3$, $AlO(OH)$, $Al_2(SO_4)_3$, and $Al_2O_3$; and wherein the magnesium-containing compound is selected from the group consisting of $Mg(OH)_2$, $MgO$, $MgSO_4$, and $Mg(NO_3)_2$.

4. The method of claim 1, wherein the aluminum-containing compound is $Al(OH)_3$ and the magnesium-containing compound is $Mg(OH)_2$.

5. The method of claim 4, wherein the $Al(OH)_3$ and the $Mg(OH)_2$ are at a weight ratio of from about 1:1 to about 3:7.

* * * * *